(12) United States Patent
Ichinose et al.

(10) Patent No.: US 9,540,008 B2
(45) Date of Patent: Jan. 10, 2017

(54) TRAVELING STOP CONTROL DEVICE FOR TRANSPORT VEHICLE AND TRANSPORT VEHICLE WITH THE SAME

(71) Applicant: Hitachi Construction Machinery Co., Ltd., Tokyo (JP)

(72) Inventors: Masanori Ichinose, Tokyo (JP); Wataru Tanaka, Tsuchiura (JP); Shinjiro Saito, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/837,348

(22) Filed: Aug. 27, 2015

(65) Prior Publication Data

US 2016/0090089 A1    Mar. 31, 2016

(30) Foreign Application Priority Data

Sep. 29, 2014    (JP) ................. 2014-199418

(51) Int. Cl.

| | |
|---|---|
| G06F 19/00 | (2011.01) |
| B60W 30/18 | (2012.01) |
| B60T 8/172 | (2006.01) |
| G05D 1/02 | (2006.01) |
| B60T 7/18 | (2006.01) |

(52) U.S. Cl.
CPC ............. *B60W 30/18* (2013.01); *B60T 7/18* (2013.01); *B60T 8/172* (2013.01); *G05D 1/0223* (2013.01); *B60T 2270/413* (2013.01); *G05D 2201/0202* (2013.01)

(58) Field of Classification Search
CPC ........... B60W 30/18; B60T 7/18; B60T 8/172; G05D 1/02
See application file for complete search history.

(56) References Cited

U.S. PATENT DOCUMENTS

| | | | |
|---|---|---|---|
| 2015/0239470 A1* | 8/2015 | Rindfleisch | ........... B60W 10/06 701/110 |
| 2015/0267380 A1* | 9/2015 | Kaneko | .................... B60K 6/46 701/22 |

FOREIGN PATENT DOCUMENTS

JP    2006-096191 A    4/2006

* cited by examiner

*Primary Examiner* — Hussein El Chanti
(74) *Attorney, Agent, or Firm* — Mattingly & Malur, PC (57) ABSTRACT

A traveling stop control device for a transport vehicle includes: a torque command value setting module that sets a torque command value for the transport vehicle based on a target speed and an actual speed of the transport vehicle; a threshold value setting module that sets an upper limit threshold value for the torque command value based on information regarding the state of the transport vehicle; and a traveling stop determination module that determines the traveling stop of the transport vehicle. The traveling stop determination module determines the traveling stop of the transfer vehicle on condition that the torque command value exceeds the upper limit threshold value and that the actual speed of the transport vehicle is zero or close to zero.

12 Claims, 12 Drawing Sheets

| LINK ID | HEAD NODE ID | END NODE ID | ROUTE DEMAND VEHICLE SPEED | ROAD WIDTH | GRADIENT | CURVATURE |
|---|---|---|---|---|---|---|
| 21A | $(X_{22A}, Y_{22A})$ | $(X_{22B}, Y_{22B})$ | $V_{21A}$ | $W_{21A}$ | $S_{21A}$ | $C_{21A}$ |
| 21B | $(X_{22B}, Y_{22B})$ | $(X_{22C}, Y_{22C})$ | $V_{21B}$ | $W_{21B}$ | $S_{21B}$ | $C_{21B}$ |

FIG. 11

TRAVELING STOP CONTROL DEVICE FOR TRANSPORT VEHICLE AND TRANSPORT VEHICLE WITH THE SAME

BACKGROUND

Field of the Invention

The present invention relates to a traveling stop control device for a transport vehicle and further, to a transport vehicle with the device.

Description of the Related Art

In open pit mines or the like, a transport vehicle such as a dump truck travels for transporting evacuated ore or earth and sand. The transport vehicle loads the transport object on its vessel (body) at a loading site and transports the loaded transport object to an earth dumping site to perform earth discharging. A bund for restraining the transport vehicle from traveling outside a traveling area is disposed at the earth dumping site. Further, also at an apron, a bund for a transport vehicle is provided for safety purpose. It is important to stop the transport vehicle safely when the same is brought into contact with the bund. The importance is high particularly in mine fields or the like in which unmanned transport vehicles travel.

A technology for stopping a vehicle at a bund is known from Japanese Patent Application Publication No. 2006-96191. This application describes the contents "A stop control module is connected to force detection sensors for detecting forces acting on four wheels in a front-rear direction, and when the variation in increase of the forces in the direction to effect a stop against the forces acting in the forward-rearward direction of the wheels on a moving-direction side exceeds a predetermined threshold value and when the magnitude in the direction to effect a stop of the forces acting in the forward-rearward direction of the wheels on the moving-direction side exceeds a predetermined value, it is judged that the wheels on the moving-direction side have come to collision with a bund member. Further, when the magnitude in the direction to effect a stop of the forces acting in the forward-rearward direction of the wheels on the moving-direction side exceeds a predetermined value and when the forces acting in the forward-rearward direction of the wheels on the moving-direction side and the forces acting in the forward-rearward direction of the wheels on the opposite side to the moving-direction side are opposite in direction, it is judged that the wheels on the moving-direction side are about to go over the bund member." (refer to Abstract).

However, in the technology of the aforementioned Japanese Patent Application Publication No. 2006-96191, the contact of the vehicle with the bund is detected by a sensor that is used for contact judgment such as a force detection sensor, and thus, in the case of the force detection sensor falling in failure, there is a possibility that the contact with an obstacle cannot be detected correctly thereby making it unable to stop the vehicle.

SUMMARY

The present invention has been made taking the aforementioned circumstances into consideration, and it is an object of the present invention to stop a transport vehicle when the transport vehicle is brought into contact with a bund even where a sensor used for contact judgment is not employed or falls in failure.

In order to accomplish the aforementioned object, a feature of a traveling stop control device for a transport vehicle according to the present invention resides in comprising a torque command valve setting module for setting a torque command value for the transport vehicle based on a target vehicle speed and an actual vehicle speed of the transport vehicle, a threshold value setting module for setting an upper limit threshold value of the torque command value based on information regarding the state of the transport vehicle, and a traveling stop determination module for determining the traveling stop of the transport vehicle, wherein the traveling stop determination module determines the traveling stop of the transport vehicle on condition that the torque command value exceeds the upper limit threshold value and that the actual speed of the transport vehicle is zero or close to zero.

According to the present invention, it is possible to stop the transport vehicle when the same is brought into contact with the bund even where a sensor used for contact judgment is not employed or falls in failure. The foregoing and other objects, constructions and many of the attendant advantages of the present invention may readily be appreciated from the description of the following preferred embodiments.

BRIEF DESCRIPTION OF THE DRAWINGS

Non-limiting and non-exhaustive embodiments of the present embodiments are described with reference to the following FIGURES, wherein like reference signs refer to like parts throughout the various views unless otherwise specified.

FIG. 3A and FIG. 3B are block diagrams showing hardware configurations of a control server and a dump truck, wherein FIG. 3A shows the control server, while FIG. 3B shows the dump truck.

FIG. 5A and FIG. 5B are a chart and a table showing one example of route data stored in the control server, wherein FIG. 5A schematically shows the route data, while

FIG. 10A is a graph showing the relation between a traveling position and a traveling speed command value when the dump truck approaches a bund, while

DETAILED DESCRIPTION

Hereafter, embodiments of the present invention will be described with reference to the drawings. The following description is directed to concrete examples of the content of the present invention, and the present invention is not limited to the following description and may be subjected, within the scope of the technical concept disclosed in the present specification, to various alterations and modifications made by a person skilled in the art. In all drawings for describing the present invention, the same reference signs are indicative in the case of same function, and repeat description is omitted.

First Embodiment

Figure 1:
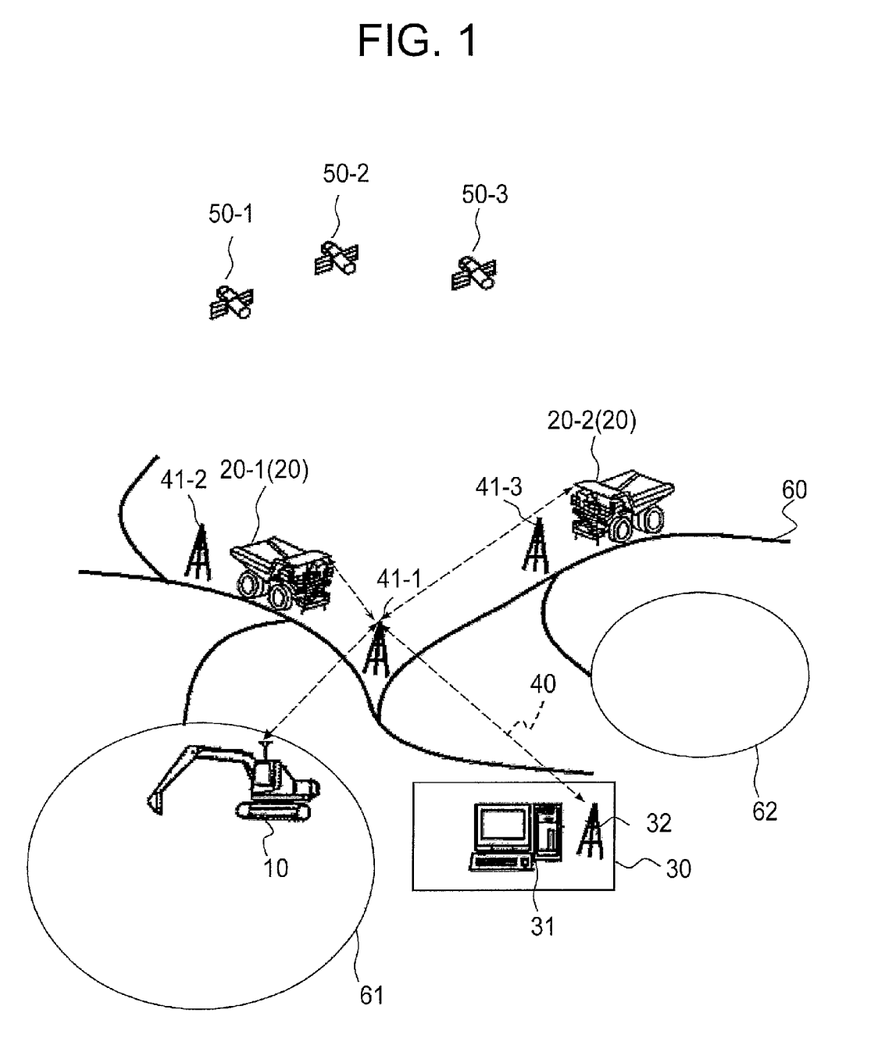
FIG. 1 is an illustration showing a schematic construction in a mining filed.
Figure 2:
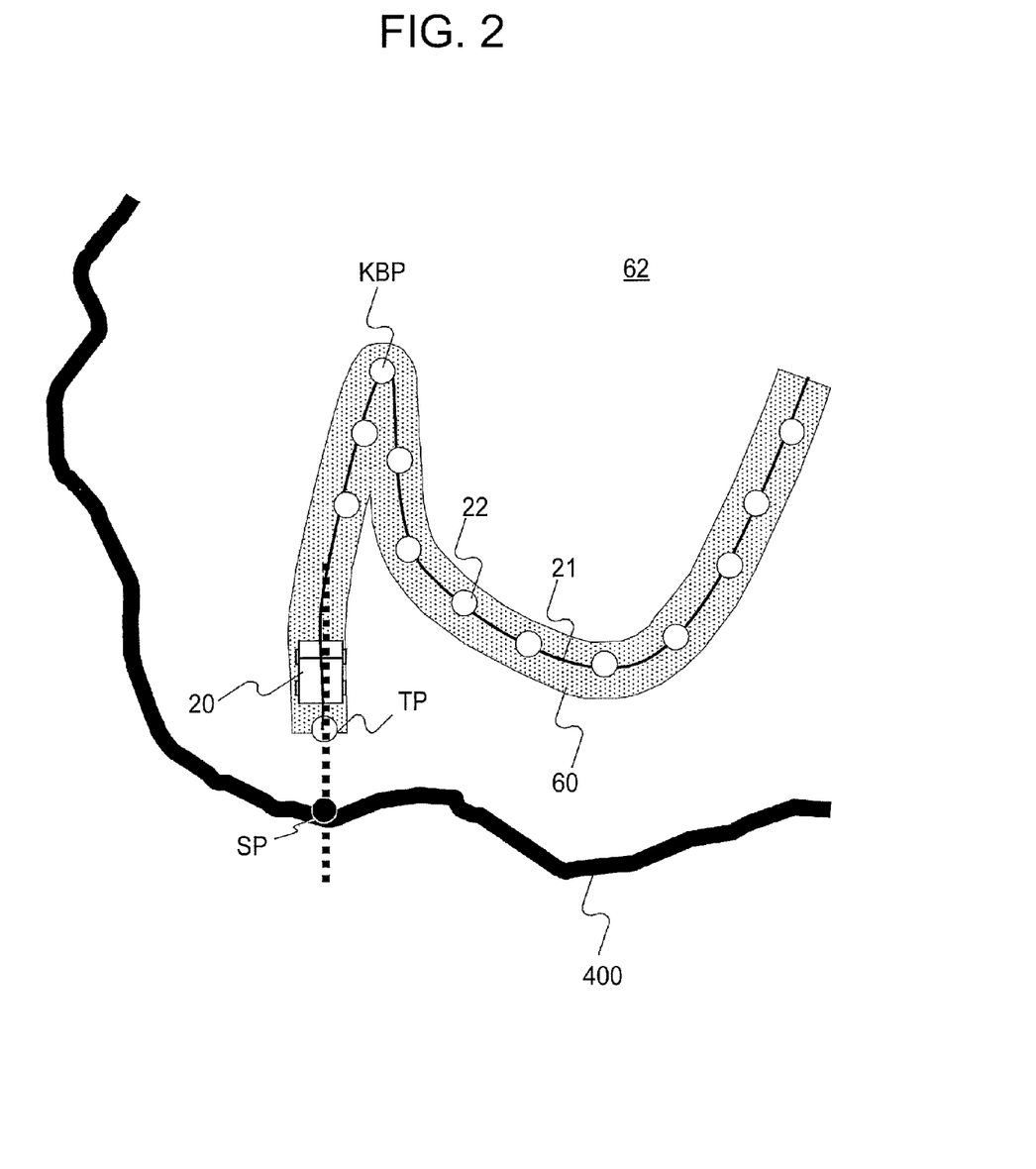
FIG. 2 is an illustration showing a traveling route for a dump truck in an earth dumping site shown in FIG. 1.

With reference to FIG. 1 and FIG. 2, description will be made regarding the schematic construction of a mining field in which a mining dump truck travels as a transport vehicle on which a traveling stop control device is mounted according to the present embodiment. FIG. 1 is an illustration showing the schematic construction of the mining field, and FIG. 2 is an illustration showing a traveling route for the dump truck at an earth dumping site.

As shown in FIG. 1, in the mining field, there is provided a traveling route 60 connecting a loading site 61 and an earth dumping site 62. At the loading site 61, a power shovel 10 that performs loading operations for earth and sand or ore performs excavation operations. Then, dump trucks 20-1, 20-2 are loaded at the loading site 61 with loads such as earth and sand or ore by the power shovel 10 and then, autonomously travel along the traveling route 60 toward the earth dumping site 62. Upon arriving at the earth dumping site 62, the dump trucks 20-1, 20-2 discharge the loads. In the following description, the dump truck is designated as the dump truck 20 unless the dump trucks 20-1 and 20-2 are discriminated from each other.

At the earth dumping site 62, as shown in FIG. 2, the dump truck 20 autonomously travels on the traveling route 60 and switches the traveling direction from a forward movement to a reverse movement at a reversing point KBP to go back to a target point TP on the basis of map information and finally moves to and stops at a target stop position SP where a bund 400 is provided. Thereafter, the dump truck 20 performs an earth discharging operation and then travels toward the loading site 61 with itself unloaded. The traveling of the dump truck 20 from the target position TP to the target stop position SP is controlled based on sensor information from an external sensor 231 (refer to FIG. 3 and the like).

The dump trucks 20-1, 20-2 are connected by telecommunication to a control server 31 installed in a control center 30 via a radio communication channel 40. Thus, the dump trucks 20-1, 20-2 travel under the control of the control server 31. The numeral 32 in FIG. 1 denotes a radio communication antenna connected to the control server 31, and numerals 41-1, 41-2 and 41-3 denote radio mobile stations.

The dump truck 20 is provided with a position calculation device (not shown in FIG. 1) for receiving positioning radio waves from at least three navigation satellites 50-1, 50-2 and 50-3 of a global navigation satellite system (GNSS) to obtain the position of its own vehicle. Besides GPS being widespread as a GNSS and administrated by the U.S., there may be used GLONASS administrated by Russia, GALILEO administrated by European Union or the like.

The control server 31 is able to take into account travelling positions and target routes of all of the dump trucks 20-1, 20-2 and the operation goal and operation efficiency of the mine, calculate (determines) controlled demand vehicle speeds being the vehicle speeds (scalar quantities) that the control server 31 wants to apply to the respective dump trucks 20-1, 20-2 during the traveling thereof, and inform the respective dump trucks 20-1, 20-2 of the controlled demand vehicle speeds.

Figure 3A:
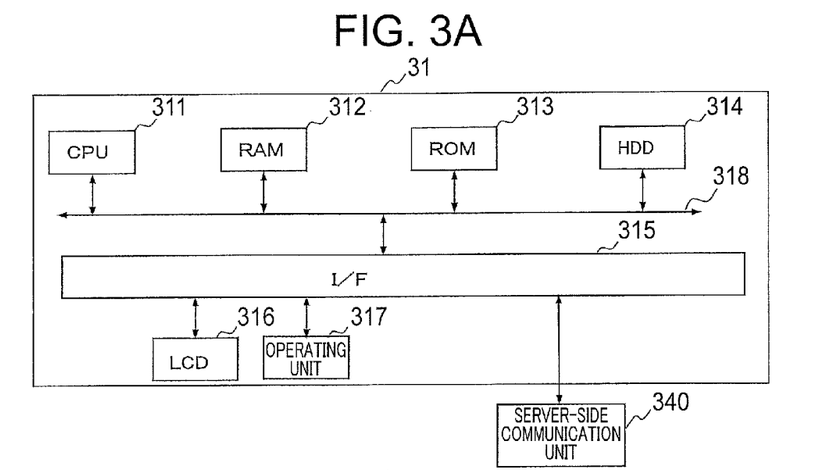
Figure 3B:
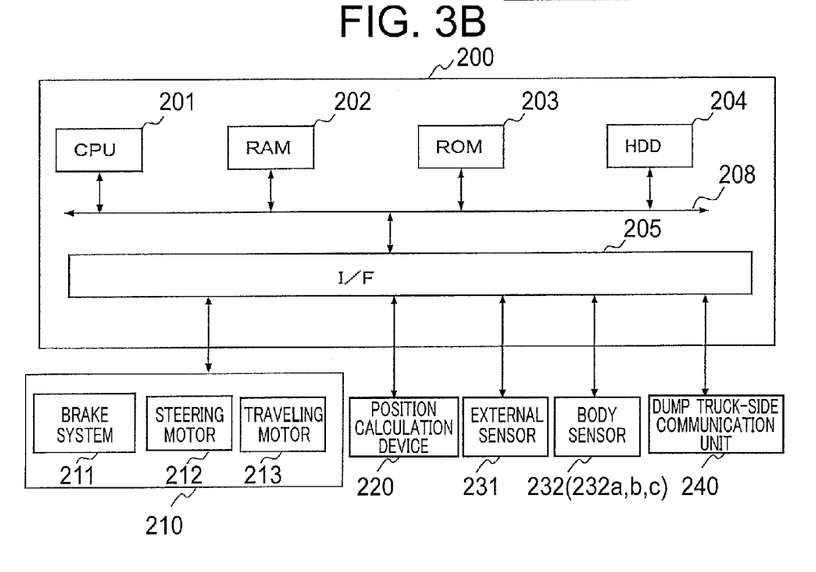

Next, electric configurations of the control server 31 and the dump truck 20 shown in FIG. 1 will be described with reference to FIG. 3A and FIG. 3B. FIG. 3A and FIG. 3B are block diagrams showing the hardware configurations of the control server 31 and the dump truck 20, respectively, wherein FIG. 3A represents the control server 31, whereas FIG. 3B represents the dump truck 20.

As shown in FIG. 3A, the control server 31 includes a CPU 311, a RAM (Random Access Memory) 312, a ROM (Read-Only Memory) 313, an HDD (Hard Disk Drive) 314, an I/F (Interface) 315, and a bus 318, and is configured by having the CPU 311, the RAM 312, the ROM 313, the HDD 314 and the I/F 315 connected with one another through the bus 318.

Further, the control server 31 is provided with an LCD (Liquid Crystal Display) 316 and an operating unit 317, which are connected to the I/F 315.

The CPU 311 is an arithmetic logical unit, which controls the whole operations of the control server 31.

The RAM 312 is a volatile storage medium capable of performing high-speed reading and writing of information and is used as working areas when the CPU 311 processes information.

The ROM 313 is a non-volatile storage medium for read-only use and stores therein an autonomous traveling control program featuring the present embodiment.

The HDD 314 is a non-volatile storage medium capable of reading and writing information and stores therein an OS (Operating System), various control programs, application programs and the like.

The LCD 316 is a visual user interface for enabling a user to confirm the traveling states of the dump trucks 20 in the mining field.

The operating unit 317 is a user interface such as a keyboard or a touch panel (not shown) laminated on the LCD 316 for enabling the user to input information to the control server 31.

A server-side communication unit 340 for connection to the radio communication channel 40 is connected to the I/F 315 of the control server 31.

On the other hand, as shown in FIG. 3B, the dump truck 20 is provided with a traveling control device 200 for executing a control processing for autonomous traveling, a traveling drive device 210 for driving the traveling of the dump truck 20 in accordance with control instructions from the traveling control device 200, a position calculation device 220 for calculating estimated positions of its own vehicle of the dump truck 20, an external sensor 231 such as a laser sensor for recognizing surrounding circumstances of the dump truck 20, a body sensor 232 (232a, 232b, and 232c) for recognizing vehicle information (information in relation to the state of the dump truck 20) on a vehicle tilt, a load or the like, and a dump truck-side communication unit 240 for connection to the radio communication channel 40.

The traveling drive device 210 includes a brake system 211 for putting a brake on the dump truck 20, a steering motor 212 for altering the steering angle of the dump truck 20, and a traveling motor 213 for making the dump truck travel.

The position calculation device 220 is a GPS device or an IMU for calculating estimated positions of its own vehicle upon receiving positioning radio waves from the navigation satellites 50-1, 50-2 and 50-3.

The traveling control device 200 includes a CPU 201, a RAM 202, a ROM 203, an HDD 204, an I/F 205, and a bus 208, and is configured by having the CPU 201, the RAM 202, the ROM 203, the HDD 204 and the I/F 205 connected with one another through the bus 208. Further, the I/F 205 is connected to the traveling drive device 210, the position calculation device 220, the external sensor 231, the body sensor 232 and the dump truck-side communication unit 240.

In the hardware configuration like this, an autonomous traveling control program stored in a storage medium such as the ROMs 203, 313 or the HDDs 204, 314 or an optical disk (not shown) is read out into the RAMS 202, 312 and is executed under the control of the CPUs 201, 311. Thus, the autonomous traveling control program (software) and the hardware are brought into cooperation to constitute functional blocks that realize the functions of the control server 31 and the traveling control device 200. Although in the present embodiment, the configurations of the control server 31 and the traveling control device 200 are described as software-hardware combinations, the function of, in particular, the dump truck 20 may be configured by the use of logic circuits that realize the function of the autonomous traveling control program executed on the dump truck side.

Figure 4:
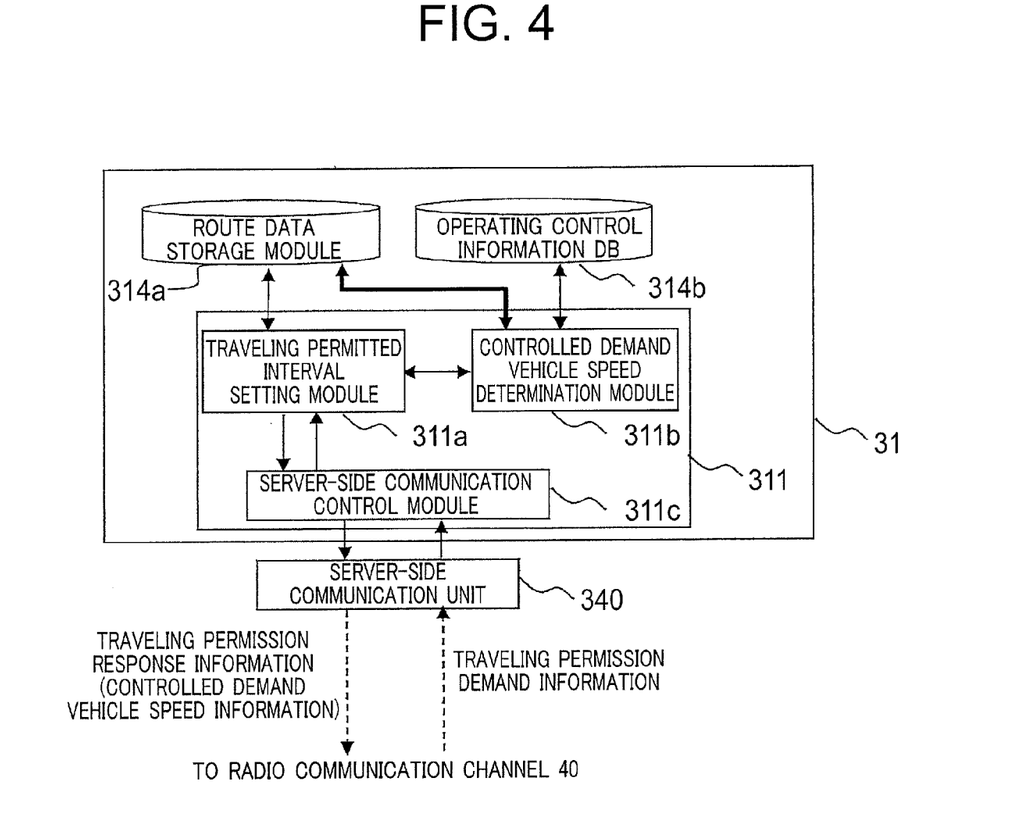
FIG. 4 is a functional block diagram showing primary functions of the control server.
Figure 5A:
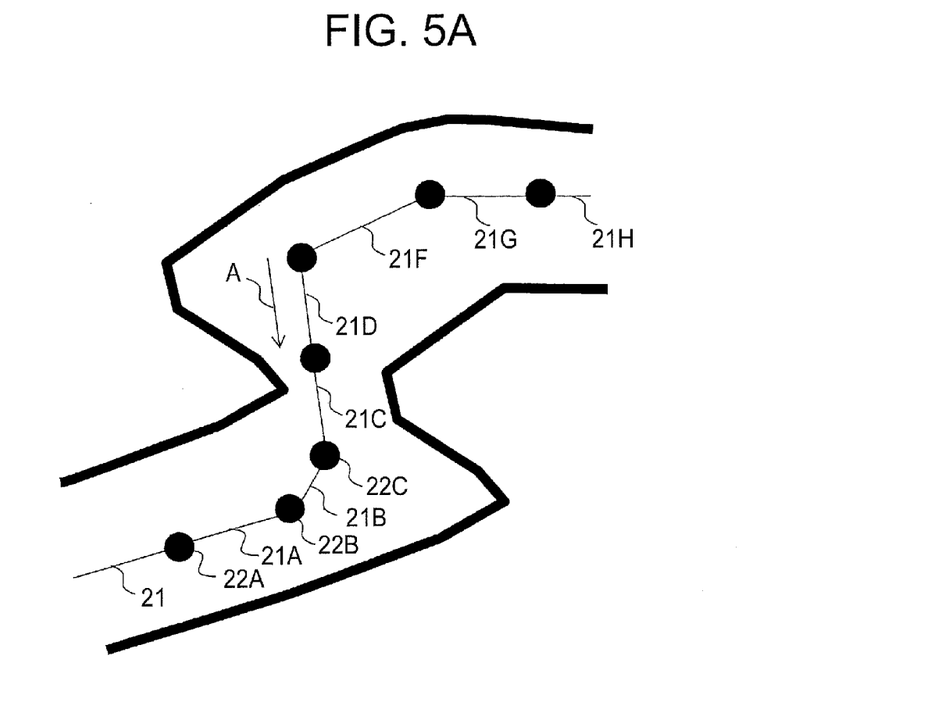
Figure 5B:
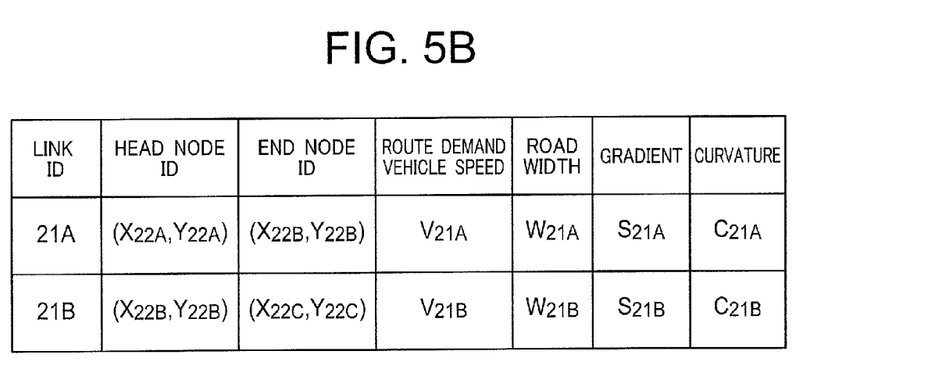
FIG. 5B shows a data structure example of the route data.

Next, the functional configuration of the control server 31 will be described with reference to FIG. 4, FIG. 5A and FIG. 5B. FIG. 4 is a functional block diagram showing primary functions of the control server 31. FIG. 5A and FIG. 5B are a chart and a table showing one example of route data stored in the control server 31, wherein FIG. 5A schematically shows the route data, whereas FIG. 5B shows a data structure example of the route data.

As shown in FIG. 4, the control server 31 is provided with a traveling permitted interval setting module 311a, a controlled demand vehicle speed determination module 311b, a server-side communication control module 311c, a route data storage module 314a, and an operating control information data base (hereinafter, the data base is abbreviated as "DB") 314b. The traveling permitted interval setting module 311a, the controlled demand vehicle speed determination module 311b and the server-side communication control module 311c are configured by the autonomous traveling control program executed by the control server 31.

The route data storage module 314a is configured by the use of a storage device of a fixed storage type such as the HDD 314. As shown in FIG. 5A, the route data is defined by position information on respective points (hereafter called "nodes") 22 on the traveling route 60 and links 21 connecting the respective nodes 22. Further, the route data may include topographic information of the mine and absolute coordinates (three-dimensional actual coordinates calculated based on the positioning radio waves) of the respective nodes 22. Each node 22 is given identification information (hereafter called "node ID") for uniquely identifying the node 22.

Each link 21 has a forward direction (the arrow A direction in FIG. 5A) and also has a head node and an end node defined. Then, as shown in FIG. 5B, in the route data, a link ID (e.g., 21A) being identification data for uniquely identifying each link is correlated with data that includes coordinate values ($X_{22}$, $Y_{22A}$) of a head node ID and coordinate values ($X_{22B}$, $Y_{22B}$) of an end node ID for the link and a route demand vehicle speed $V_{21A}$, a road width $W_{21A}$, a gradient $S_{21A}$, and a curvature $C_{21A}$ at the time of traveling on the link.

The route demand vehicle speed is determined in dependence on a road specification such as the gradient, curvature and road width of the route. The route demand vehicle speed becomes a possible target vehicle speed at the time of actual traveling of the dump truck 20.

The operating control information DB 314b stores operation control information indicating the positions of the respective dump trucks 20 traveling on the traveling route 60.

The traveling permitted interval setting module 311a responds to traveling permission demand information transmitted from each dump truck 20 and sets the next traveling permitted interval to the dump truck 20. Specifically, with reference to the operation control information in the operating control information DB 314b, the traveling permitted interval setting module 311a grasps the position of the other dump truck traveling ahead of the dump truck 20 concerned. Then, with reference to the route data in the route data storage module 314a, the traveling permitted interval setting module 311a sets a forward boundary point of a newly set traveling permitted interval at a point that is behind by a distance (stop enabling distance) which is necessary at least for the dump truck 20 to be braked and stopped, from the present position of the other dump truck traveling ahead thereof on the traveling route 60. Further, the traveling permitted interval setting module 311a sets a rearward boundary point at a position that is spaced by the stop enabling distance from the present position of the dump truck 20 concerned. Then, the traveling permitted interval setting module 311a sets the interval between the forward boundary point and the rearward boundary point as a new traveling permitted interval that is given to the dump truck 20 issuing the traveling permission demand.

The controlled demand vehicle speed determination module 311b determines a controlled demand vehicle speed. Specifically, the controlled demand vehicle speed determination module 311b reads out route data from the route data storage module 314a and, with reference to the operating information stored in the operating control information DB 314b, determines a controlled demand vehicle speed taking into account a route demand vehicle speed set in correspondence to a link that is included in the new traveling permitted interval having been set for the dump truck 20, a distance of the dump truck 20 from the vehicle ahead, and the state of traffic congestion. Usually, the maximum controlled demand vehicle speed is the vehicle speed that is made to correspond to each link in the route data, and in the case of traffic congestion, a vehicle speed that is slower than the maximum controlled demand vehicle speed is determined as the controlled demand vehicle speed. The controlled demand vehicle speed is outputted to the traveling permitted interval setting module 311a.

The traveling permitted interval setting module 311a generates traveling permission response information that indicates the forward boundary point and the rearward boundary point of the set new traveling permitted interval and the controlled demand vehicle speed, and outputs the generated information to the server-side communication control module 311c.

The server-side communication control module 311c controls receiving the traveling permission demand information for each dump truck 20 and transmitting the traveling permission response information generated in response to the traveling permission demand information.

Figure 6:
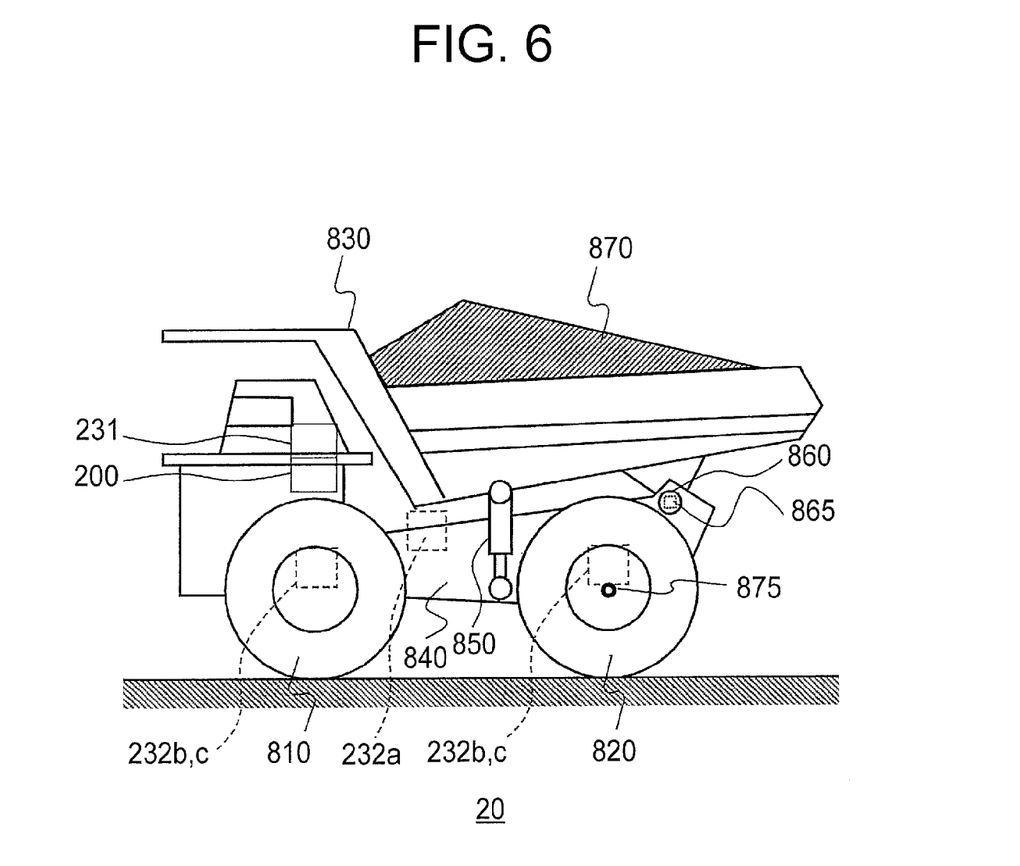
FIG. 6 is a side view showing the entire construction of the dump truck.

Next, description will be made regarding functional configurations relating to the entire construction of the dump truck 20 and the autonomous traveling of the dump truck 20. FIG. 6 is a side view showing the entire construction of the dump truck 20, and FIG. 7 is a block diagram showing the functional configuration of the dump truck 20.

As shown in FIG. 6, the dump truck 20 is provided with front wheels 810 and rear wheels 820 attached to front and rear parts of a body frame 840, a vessel 830 rotatably supported on the body frame 840 through a support shaft 860, a hoist cylinder 850 for pivotally moving the vessel 830 about the support shaft 860 when telescopically operated, the external sensor 231 for detecting the bund 400 (refer to FIG. 8), 1400 (refer to FIG. 9) when the dump truck 20 moves, the traveling control device 200 for controlling the traveling of the dump truck 20, a tilt sensor 232a for detecting the tilt of the body, pressure sensors 232b for detecting the pressures in suspensions, and vehicle speed sensors 232c for detecting the vehicle speed.

The body frame 840 has primary components such as a drive system and a driver's seat mounted thereon, and the vehicle is configured to be able to travel freely on the traveling surface by the provision of the front wheels 810 and the rear wheels 820. When the hoist cylinder 850 is telescopically extended, the vessel 830 is operated to elevate a front end and increase the slant angle as the pivot movement is effected about the support shaft 860 and thus, is able to discharge the load (transport object) 870 loaded on the vessel 830 from an rear end of the same (refer to FIG. 8). Further, a potentiometer (rotary potentiometer) 865 for measuring the rotational angle of the support shaft 860 is set on the support shaft 860 as angle detection means for detecting the slant angle of the vessel 830 relative to the body frame 840. The numeral 875 denotes a rear wheel axle of the rear wheels 820. It is to be noted that the traveling drive device 210, the position calculation device 220 and the dump truck-side communication unit 240 that are shown in FIG. 3B are omitted in FIG. 6.

Figure 7:
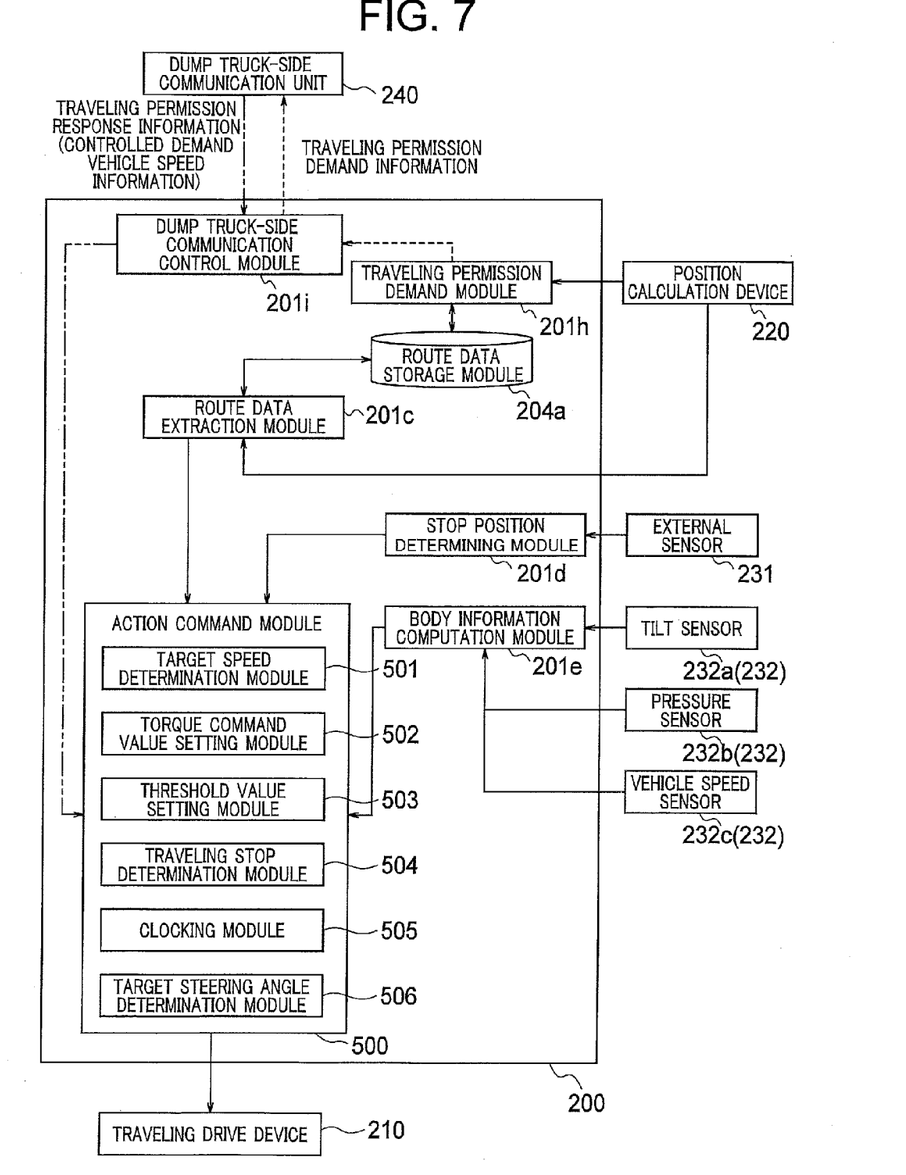
FIG. 7 is a block diagram showing the internal configuration of the dump truck.

As shown in FIG. 7, the traveling control device 200 is provided with a route data storage module 204a storing the traveling route and its attendant information, a route data extraction module 201c for extracting appropriate data from the route data storage module 204a, a stop position determining module 201d for calculating a stop position for the dump truck 20, and a body information computation module 201e for recognizing the body state such as a traveling speed, a steering angle and a live load. The traveling control device 200 is further provided with an action command module 500 for determining a target vehicle speed, a torque command value, a steering amount, a target route and the like for its own vehicle to output various command information that is necessary for controlling the traveling, a traveling permission demand module 201h for demanding the setting of a new traveling permitted interval for the next traveling when its own vehicle comes close to an end point (forward boundary point) of the traveling permitted interval during the ongoing traveling, and a dump truck-side communication control module 201i for executing radio communication control with the control server 31. The action command module 500 functions as the traveling stop control device in the claimed invention.

The route data storage module 204a records route data expressing a route along which the dump truck 20 is to travel, as aggregate of links each having points called nodes at opposite ends. Further, each link ID and its attendant information attendant thereupon are configured to be associated so that the designation of a link makes it possible to extract data tied to the link.

The route data extraction module 201c uses the position information calculated by the position calculation device 220 as a base for extracting route data that expresses the neighborhood of the calculated position. The route data extraction module 201c outputs the extracted route data to the action command module 201f.

The stop position determining module 201d discriminates the presence/absence and the shape of an obstacle that exists particularly ahead in the traveling direction of the dump truck 20 (for example, the vehicle ahead, the bund 400, 1400 or the like) based on an output from the external sensor 231 such as a laser sensor, and where the obstacle is the bund 400, 1400, calculates a target stop position for stopping the dump truck 20 in the neighborhood of the bund 400, 1400. Then, the stop position determining module 201d outputs a calculation result to the action command module 500. That is, in the present embodiment, the shape of the bund 400, 1400 is discriminated by the external sensor 231, and based on the discrimination information, the dump truck 20 is controlled to be reversed to and stopped at the bund 400, 1400.

Figure 8:
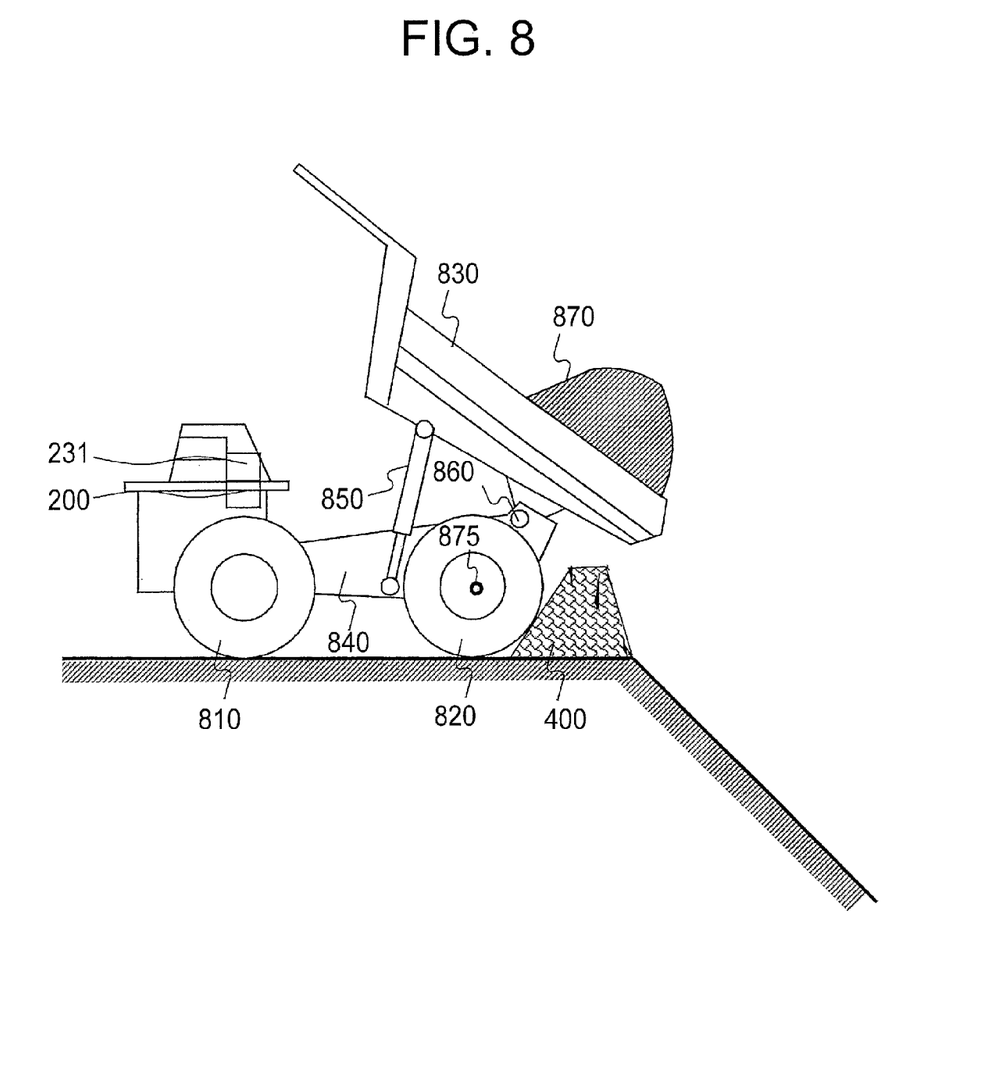
FIG. 8 is an illustration showing the state that the dump truck is performing earth discharging after stopping when the dump truck is brought into contact with a bund of a salient shape.
Figure 9:
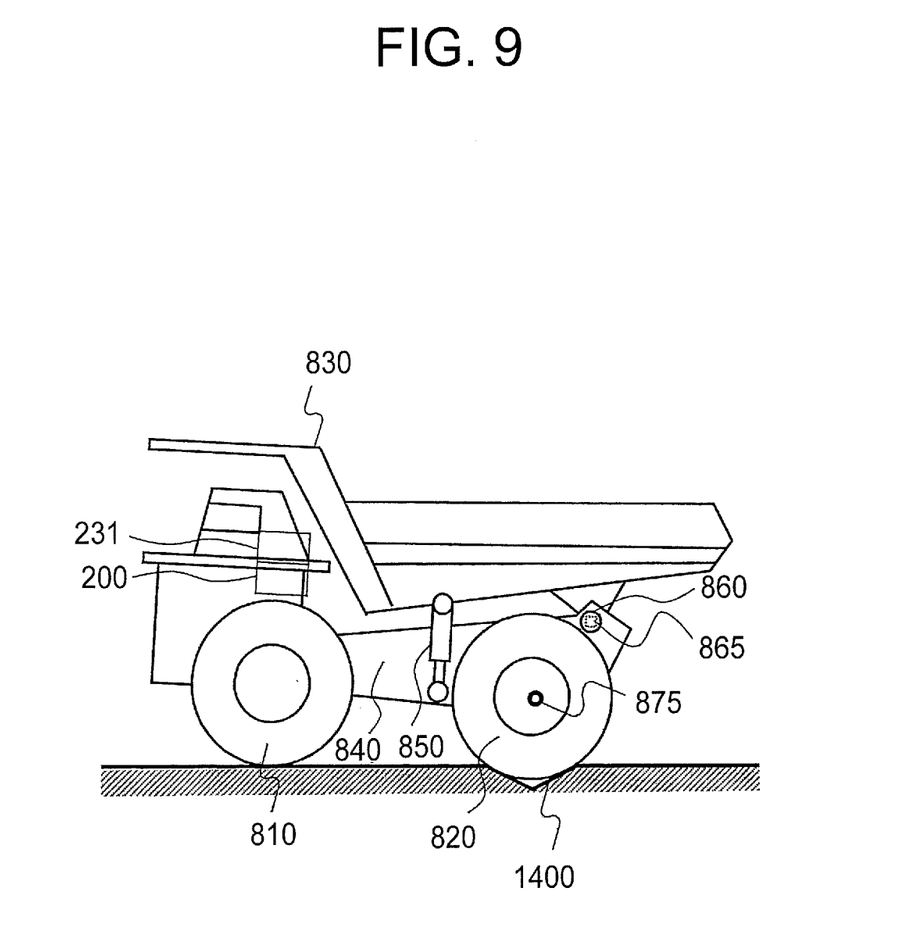
FIG. 9 is an illustration showing the state that the dump truck stops at an apron with rear wheels falling into a bund of a hollow shape.

Description is supplemented with reference to FIG. 8 and FIG. 9. FIG. 8 is an illustration showing the state that the dump truck 20 is discharging the load 870 after stopping when the dump truck is brought into contact with the bund 400 of a salient shape, whereas FIG. 9 is an illustration showing the state that at an apron, the dump truck 20 stops with the rear wheels 820 falling in the bund 1400 of a hollow shape (V-shape). Like these illustrations, in the present embodiment, the stop position determining module 201d calculates a target stop position based on the information outputted from the external sensor 231 so that the dump truck 20 stops at the position of the bund 400, 1400. Further, in the present embodiment, control is also performed under which the dump truck 20 is stopped by the use of body sensors 232 (232a, 232b, 232c) independently of the external sensor 231 (details described later). As the external sensor 231, besides the laser sensor, there may be used a millimeter-wave sensor, a stereo camera or the like.

Referring back to FIG. 7, the traveling permission demand module 201h compares the position data of its own vehicle obtained from the position calculation device 220 with the route data read out from the route data storage module 204a, judges whether or not its own vehicle has arrived at the point (traveling permission demand point) where the traveling permission demand information is to be transmitted for demanding the setting of the next traveling permitted interval, and in the case of having arrived, transmits the traveling permission demand information to the dump truck-side communication control module 201i.

The dump truck-side communication control module 201i performs the control of transmitting to the control server 31 the traveling permission demand information for demanding the next traveling permitted interval and of receiving the traveling permission response information (including controlled demand vehicle speed information) from the control server 31.

The body information computation module 201e computes values representing the body state of the dump truck 20 such as a steering angle, a traveling speed, a live load and a body tilt based on the outputs from various body sensors 232. For example, the body information computation module 201e computes a body tilt based on the output from the tilt sensor 232a for detecting the body tilt and computes a steering angle based on the output from a rotary angle sensor attached to a steering shaft. Further, the body information computation module 201e computes a traveling speed based on rotational speeds outputted from wheel speed sensors (hereafter, vehicle speed sensors) 232c measuring the rotational speeds of the front wheels 810 and the rear wheels 820 as well as on the tire specification.

Furthermore, the body information computation module 201*e* computes a live load and a body tilt based on the outputs from pressure sensors 232*b* capable of measuring the pressures in suspensions installed for the respective wheels. Then, the body information computation module 201*e* infers the shape of the bund from the body tilt or the balancing state of the suspension pressures. More specifically, the shape of the bund is classified roughly into two patterns as described earlier, one of which represents the bund 400 of the salient shape as shown in FIG. 8 and the other of which represents the bund 1400 of the hollow shape as shown in FIG. 9.

Now, let it be assumed that the dump truck 20 is brought into contact with the bund as it travels backward (reverse). Where the dump truck 20 takes a posture to be horizontal or to somewhat tilt forward (forward tilting), it is likely that the dump truck hits a salient portion and cannot reverse any longer or that the dump truck tilts forward in the process of going over the salient portion. Thus, the shape of the bund in this case can be inferred as a salient shape. On the other hand, where the dump truck 20 tilts backward (backward tilting), it is likely that the rear wheels 820 have fallen in a ditch, and thus, the shape of the bund in this case can be inferred as a hollow shape.

In this way, in order to infer the shape of the bund, in the present embodiment, the body tilt is detected not by the use of any special sensor but by the use of at least one of the tilt sensor 232*a* or the pressure sensors 232*b* which have been equipped heretofore, and the shape of the bund is inferred from the tilt of the body. As mentioned earlier, it is possible to discriminate the shape of the bund by the use of the external sensor 231. However, in order that the dump truck 20 can stop at the bund even in the event of the failure of the external sensor 231, in the present embodiment, the shape of the bund is inferred based on at least one of the tilt sensor 232*a* and the pressure sensors 232*b*.

The action command module 500 corresponds to the traveling stop control device of the preset invention and as shown in FIG. 7, comprises a target speed determination module 501 for determining a target speed for the dump truck 20, a torque command value setting module 502 for setting a torque command value given to the traveling motor to enable the dump truck 20 to travel on a target route at the target speed, a threshold value setting module 503 for setting an upper limit threshold value for the torque command value, a traveling stop determination module 504 for determining whether to stop the traveling of the dump truck 20 or not, a clocking module 505 for operating a timer to clock the time, and a target steering angle determination module 506 for determining a target value for the steering angle to avoid the deviation from the target route. In addition to performing a traveling control in dependence on the body information outputted from the body information computation module 201*e*, the action command module 500 also performs a control to stop the traveling of the dump truck 20 when the dump truck 20 is in contact with the bund, as described hereafter.

Figure 10A:
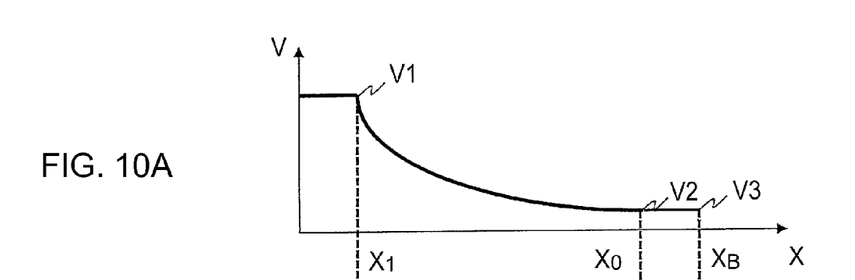
Figure 10B:
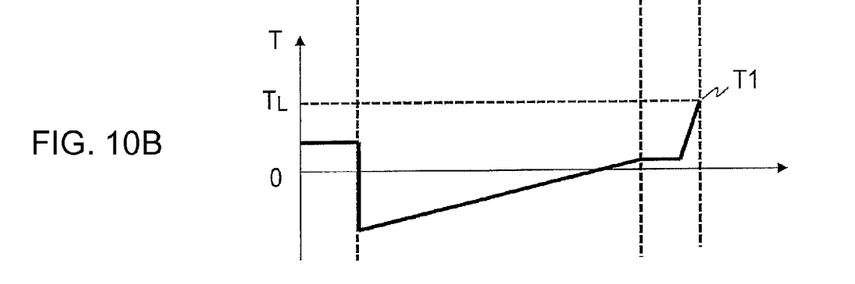
FIG. 10B is a graph showing the relation between a traveling position and a torque command value when the dump truck approaches the bund.

FIG. 10A and FIG. 10B are graphs respectively showing the relation between a traveling position and a traveling speed command value and the relation between a traveling position and a torque command value when the dump truck 20 moves to a target stop position in the vicinity of the bund. As shown in FIG. 10A, after traveling backward (reversing) to a target stop position $X_1$ (corresponding to TP in FIG. 2) on the map at a speed $V_1$, the dump truck 20 gradually reduces the speed along a curve to a position $X_0$ before a target stop position $X_B$ (corresponding to SP in FIG. 2) where the dump truck 20 is in contact with the bund. Thereafter, the dump truck 20 keeps the reverse at a slow speed and moves from the position $X_0$ to the target stop position $X_B$. The command value in the vicinity of the target stop position $X_B$ is given as a speed V3 of the degree that enables the dump truck 20 to stop as soon as the same hits the bund. On the other hand, as shown in FIG. 10B, the torque value takes negative values to reduce the speed from the speed V1 to a speed V2 between the traveling positions $X_1$ and $X_0$ and is abruptly changed to positive values to make the actual speed approximate to the target speed V3 though the reverse movement is restrained when the dump truck 20 is brought into contact with the bund immediately before reaching the traveling position $X_B$.

Usually, control is performed to stop the dump truck 20 at the position of the bund by the external sensor 231. However, where such control is held ineffective or is unable to perform due to the failure or the like of the external sensor 231, the dump truck 20 would continue the backward traveling even after reaching the bund. Under the circumstances like this, in the present embodiment, it is possible to stop the dump truck 20 at the bund by the stop control that does not use the external sensor 231.

Figure 11:
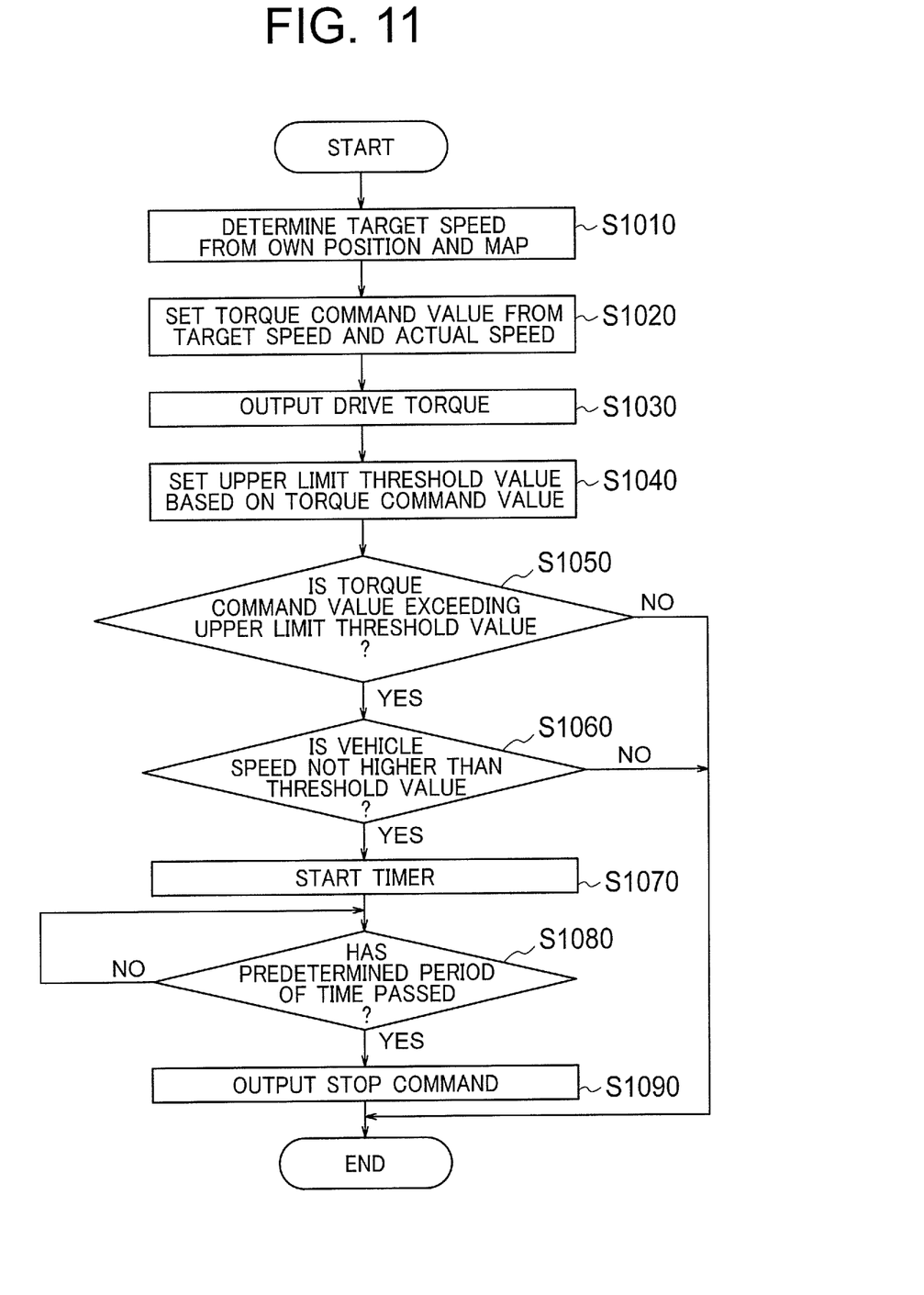
FIG. 11 is a flow chart showing processing steps for stopping the dump truck at the bund in a first embodiment.

FIG. 11 is a flow chart showing the processing steps for stopping the dump truck 20 at a bund in the first embodiment. As shown in FIG. 11, first of all, the target speed determination module 501 determines a target speed from information on its own position from the position calculation device 220 and from the route data (map information) extracted by the route data extraction module 201*c* (S1010). The torque command value setting module 502 sets a torque command value for the actual speed to come close to the target speed, based on the difference between the determined target speed and the actual speed of the dump truck 20 detected by the vehicle speed sensors 232*c* (S1020). Then, the torque command value setting module 502 outputs the set torque value as a drive torque to the traveling drive device 210 (S1030). As the control variable, the opening degree of an accelerator pedal may be used instead of the torque command value.

The threshold value setting module 503 sets an upper limit threshold value $T_L$ (refer to FIG. 10B) based on the torque command value set at the step S1020 (S1040). More specifically, the threshold value setting module 503 sets the upper limit threshold value $T_L$ based on the actual speed (the inputs from the vehicle speed sensors 232*c*) as information regarding the state of the dump truck 20. Alternatively, the upper limit threshold value $T_L$ may be set based on an input from the tilt sensor 232*a* instead of or in addition to the inputs from the vehicle speed sensors 232*c* as the information regarding the state of the dump truck 20. Further, the upper limit threshold value $T_L$ may be set based on the inputs from the pressure sensors 232*b* instead of or in addition to the inputs from the vehicle speed sensors 232*c* and/or the tilt sensor 232*a*.

The traveling stop determination module 504 judges whether or not the torque command value set at the step S1020 exceeds the upper limit threshold value $T_L$ set at the step S1040, and if the value exceeds the upper limit threshold value $T_L$ (Yes at S1050; T1 in FIG. 10B), a judgment is made of whether or not the actual speed of the dump truck 20 detected by the vehicle speed sensors 232 is equal to or lower than a threshold value (S1060). The threshold value at step S1060 may take any value designating a speed of the degree that is sufficient to consider the dump truck 20 as having stopped. For example, the threshold value suffices to be set at zero.

Where the vehicle speed is equal to or lower than the threshold value (Yes at S1060), the clocking module 505 operates a timer (S1070). If a predetermined period of time (e.g., 10 seconds) has past (Yes at S1080), the traveling stop determination module 504 judges that the dump truck 20 is in contact with the bund, determines stopping the backward traveling of the dump truck 20 (S1090), and outputs the determination to the traveling drive device 210. In other words, because the state that the vehicle speed is almost null regardless of a predetermine torque command value being outputted is considered as the state that the dump truck 20 hits some obstacles and cannot move any longer, this state is considered as the state that the dump truck 20 is in contact with the bund, and thus, stopping the traveling is determined. The brake system 211 of the traveling drive device 210 receiving this determination brakes the dump truck 20 to discontinue or stop the traveling of the same. On the other hand, if the predetermined period of time has not passed yet at the step S1080, the processing at the step S1080 is repeated until the predetermine period of time passes. Further, if "No" is answered at the steps S1050 and S1060, the processing comes to an end.

As described above, in the first embodiment, where the dump truck 20 is brought into contact with the bund 400, 1400 and thus, is difficult to travel backward further, it is possible to stop the dump truck 20 at the bund 400, 1400 based on the actual speed of the dump truck 20 inputted from the vehicle speed sensors 232*c* and the torque command value. In addition, because the stop control is of the nature that does not use the external sensor 231, it is possible to stop the dump truck 20 at the position of the bund 400, 1400 safely even in the event of the failure of the external sensor 231. Further, the vehicle speed sensors 232*c* are devices that have been provided heretofore as standard accessories, and hence, the stop control for the dump truck 20 can be done safely by the use of the existing sensors, so that an advantage can be realized in cost.

In the first embodiment, the processing steps S1070 and 1080 may be omitted. That is, such a construction may be taken that when "Yes" is judged at the step S1060, the traveling stop determination module 504 immediately outputs the stop command. With this construction taken, the risk that the dump truck 20 goes over the bund is reduced, so that the operation of the dump truck 20 can be realized further safely.

Second Embodiment

Figure 12:
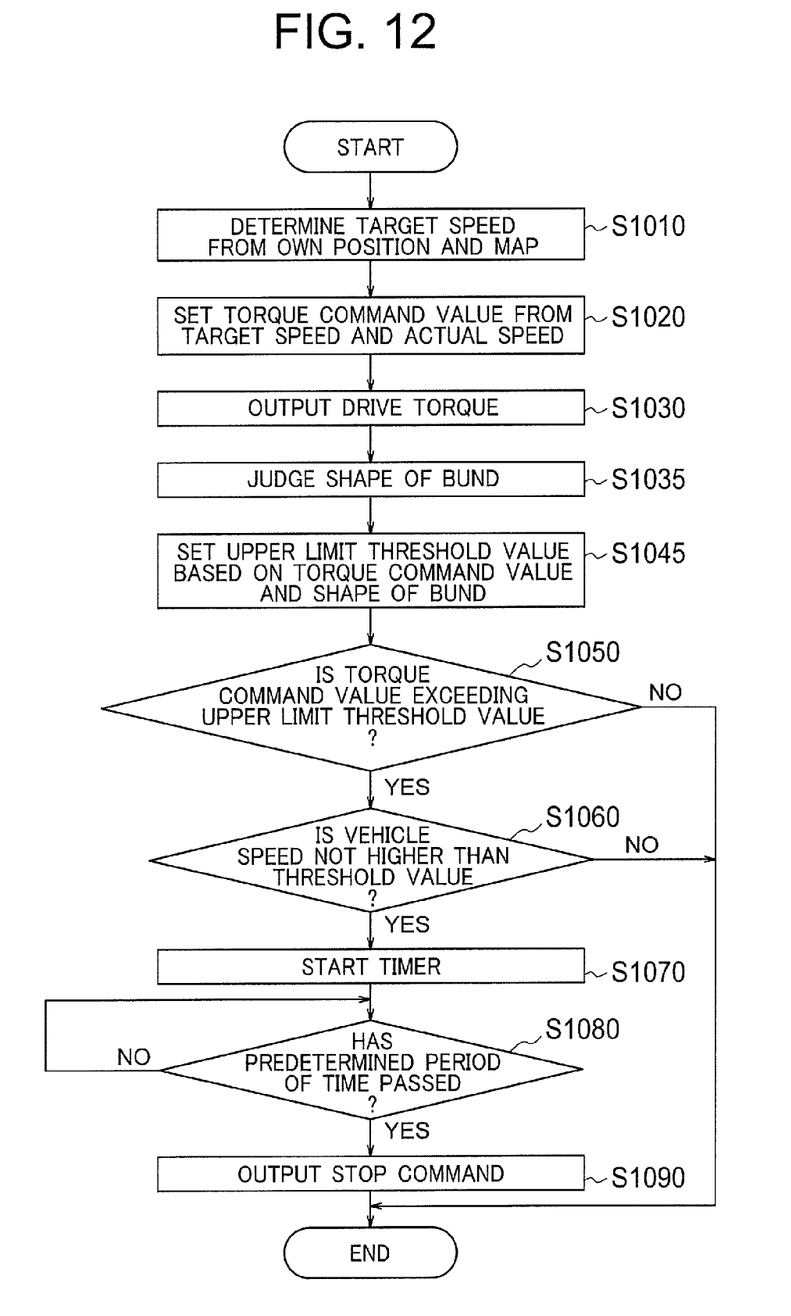
FIG. 12 is a flow chart showing processing steps for stopping the dump truck at the bund in a second embodiment.

Next, description will be made regarding the stop control for the dump truck according to a second embodiment. FIG. 12 is a flow chart showing the processing steps for stopping the dump truck 20 at the bund in the second embodiment. As shown in FIG. 12, the processing steps in the second embodiment differ from those in the first embodiment in that the step S1035 is added, and that the step S1045 is applied in place of the step S1040. Hereafter, these differences will be described.

At the step S1035, the threshold value setting module 503 judges the posture of the dump truck 20 from information regarding the body tilt outputted from the tilt sensor 232*a* or data of the suspension pressures outputted from the pressure sensors 232*b* for detecting the pressures in the suspensions. In the case of the forward tilting wherein the dump truck 20 tilts to go down forward, the shape of the bund is judged to be a salient shape (the bund 400 in FIG. 8), while in the case of the backward tilting wherein the dump truck 20 tilts to go down backward, the shape of the bund is judged to be a hollow shape (the bund 1400 in FIG. 9). The shape of the bund can be judged further accurately by differentiating the output of the tilt sensor 232*a* or the outputs of the pressure sensors 232*b* with respect to time.

At the step S1045, the threshold value setting module 503 sets an upper limit threshold value for torque in dependence on the shape of the bund judged at the step S1035. If the shape of the bund is the hollow shape shown in FIG. 9, the likelihood that the dump truck 20 continues the backward traveling beyond the bund is high in comparison with the case of the salient shape shown in FIG. 8. Thus, it is desirable that the upper limit threshold value for torque in the case of the bund 1400 taking the hollow shape be set to be lower than that in the case of the bund 400 taking the salient shape. Therefore, in the second embodiment, the threshold value setting module 503 sets a different value as the upper limit threshold value for torque based on the result of the judgment about the bund shape at the step S1035. To be more exact, in the case of the choke taking the hollow shape, the threshold value setting module 503 sets a lower upper limit threshold value for torque than that in the case of the bund taking the salient shape.

According to the foregoing second embodiment, in addition to taking the same advantageous effects as those in the first embodiment, it is possible to stop the dump truck 20 in dependence on the shape of the bund, and therefore, safety is further enhanced at the work site in a mine or the like. Moreover, the stop control for the dump truck 20 can be done by the use of the tilt sensor 232*a* or the pressure sensors 232*b* equipped as standard accessories, and hence, the second embodiment is also advantageous in cost.

It is to be noted that the present invention is applicable to other transport vehicles than the dump trucks 20, for example, to wheel loaders and the like.

What is claimed is:

1. A transport vehicle including a plurality of wheels, comprising:
   a plurality of body sensors that detect a state of the transport vehicle;
   a traveling drive device;
   a traveling stop control device that controls the traveling drive device based on information regarding the state of the transport vehicle detected by the body sensors,
   wherein the traveling stop control device includes:
   a torque command value setting module that sets a torque command value for the traveling drive device based on a target speed of the transport vehicle and an actual speed of the transport vehicle which is calculated using a rotational speed of the wheels of the transport vehicle detected by a vehicle speed sensor as one of the plurality of body sensors;
   a threshold value setting module that sets an upper limit threshold value for the torque command value based on the information regarding the state of the transport vehicle detected by the body sensors;
   a traveling stop determination module that determines a traveling stop of the transport vehicle,
   wherein the traveling stop determination module outputs the determination of the traveling stop of the transport vehicle to the traveling drive device when the torque command value exceeds an upper limit threshold value and the actual speed of the transport vehicle is less than or equal to a predetermined threshold value, and wherein, when the traveling drive device receives the determination, the traveling drive device brakes the transport vehicle.

2. The transport vehicle according to claim 1, wherein: the threshold value setting module sets the upper limit threshold value differently depending on a tilt of the transport vehicle represented by the information regarding the state of the transport vehicle.

3. The transport vehicle according to claim 2, wherein: the threshold value setting module sets the upper limit threshold value at a larger value when the transport vehicle takes a forward tilting posture than the upper limit threshold value when the transport vehicle takes a backward tilting posture.

4. The transport vehicle according to claim 2, wherein: the threshold value setting module judges the tilt of the transport vehicle based on an input from a tilt sensor, as one of the plurality of body sensors, which detects the tilt of the transport vehicle.

5. The transport vehicle according to claim 2, wherein: the threshold value setting module judges the tilt of the transport vehicle based on an input from a pressure sensor, as one of the plurality of body sensors, which detects a pressure in a suspension of the transport vehicle.

6. The transport vehicle according to claim 1, wherein: the traveling stop determination module outputs the determination of the traveling stop of the transport vehicle to the traveling drive device when a predetermined period of time passes with the actual speed of the transport vehicle being less than or equal to the predetermined threshold value.

7. A transport vehicle including a plurality of wheels, comprising:
a plurality of body sensors that detect a state of the transport vehicle;
a traveling drive device which drives the transport vehicle;
a processor connected to the body sensors and the traveling drive device; and
wherein the processor is configured to:
set a torque command value for the traveling drive device based on a target speed of the transport vehicle and an actual speed of the transport vehicle calculated using a rotational speed of the wheels of the transport vehicle detected by a vehicle speed sensor as one of the plurality of body sensors,
set an upper limit threshold value for the torque command value based on the information regarding the state of the transport vehicle detected by the body sensors;
determine a traveling stop of the transport vehicle when the torque command value exceeds the upper limit threshold value and the actual speed of the transport vehicle is less than or equal to a predetermined threshold value, and
output the determination of the traveling stop of the transport vehicle to the traveling drive device, and
wherein, when the traveling drive device receives the determination of the traveling stop, the traveling drive device brakes the transport vehicle.

8. The transport vehicle according to claim 7, wherein the processor is further configured to:
set the upper limit threshold value differently depending on a tilt of the transport vehicle represented by the information regarding the state of the transport vehicle.

9. The transport vehicle according to claim 8, wherein the processor is further configured to:
set the upper limit threshold value at a larger value when the transport vehicle takes a forward tilting posture than the upper limit threshold value when the transport vehicle takes a backward tilting posture.

10. The transport vehicle according to claim 8, wherein the processor is further configured to:
judge the tilt of the transport vehicle based on an input from a tilt sensor, as one of the plurality of body sensors, which detects the tilt of the transport vehicle.

11. The transport vehicle according to claim 8, wherein the processor is further configured to:
judge the tilt of the transport vehicle based on an input from a pressure sensor, as one of the plurality of body sensors, which detects a pressure in a suspension of the transport vehicle.

12. The transport vehicle according to claim 7, wherein the processor further configured to:
output the determination of the traveling stop of the transport vehicle to the traveling drive device when a predetermined period of time passes with the actual speed of the transport vehicle being less than or equal to the predetermined threshold value.

* * * * *